United States Patent [19]

DeCesare

[11] 4,164,239

[45] Aug. 14, 1979

[54] HOT AND COLD WATER RATIO AND VOLUME MANUAL DEVICE

[76] Inventor: Dominic V. DeCesare, 223 Center St., Elizabeth, N.J. 07202

[21] Appl. No.: 749,231

[22] Filed: Dec. 10, 1976

[51] Int. Cl.² ............................................ F16K 11/22
[52] U.S. Cl. ................................ 137/553; 137/637.4; 137/556
[58] Field of Search ............... 137/607, 637, 625.17, 137/625.41, 637.4, 553, 556

[56] References Cited

U.S. PATENT DOCUMENTS

| 164,448 | 6/1875 | Hallett | 137/625.41 |
|---|---|---|---|
| 1,529,529 | 3/1925 | Wojahn | 137/625.41 |
| 1,912,295 | 5/1933 | Mintz | 137/607 |
| 2,225,210 | 12/1940 | Dillon | 137/625.41 X |
| 2,332,995 | 10/1943 | Eaton | 137/607 X |
| 2,463,640 | 3/1949 | Plett | 236/12 R |
| 2,527,836 | 10/1950 | Miller | 137/607 X |
| 2,575,305 | 11/1951 | Stryzakoski et al. | 137/607 X |
| 2,707,486 | 5/1955 | Johns | 137/625.41 |
| 2,847,031 | 8/1958 | Brown, Jr. | 137/625.41 X |
| 3,115,896 | 12/1963 | Roberts et al. | 137/625.41 |
| 3,393,706 | 7/1968 | Burhop | 137/607 X |
| 3,460,570 | 8/1969 | Bucknell et al. | 137/607 |
| 3,661,181 | 5/1972 | Palmer et al. | 137/625.17 |
| 3,998,227 | 12/1976 | Holbrook et al. | 137/625.41 X |

*Primary Examiner*—William R. Cline

[57] ABSTRACT

In a mixing valve assembly a rotatable control valve is provided for mixing in a desired ratio the fluid from two separate sources such as hot and cold water inlets. The valve porting is arranged such that full water pressure will be maintained as a result of at least one control outlet being substantially fully open at all times. A separately actuated volume control valve is included in the assembly. A visual indicator provides a scale indicative of selected water mix ratio.

1 Claim, 6 Drawing Figures

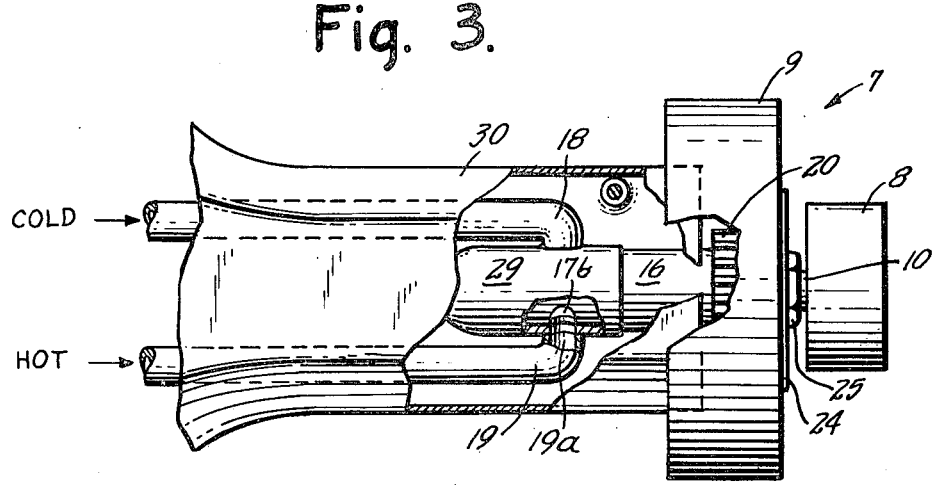
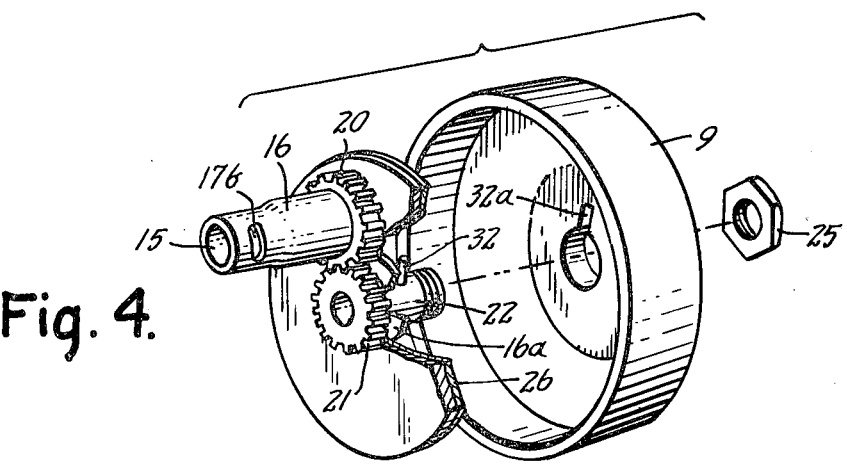
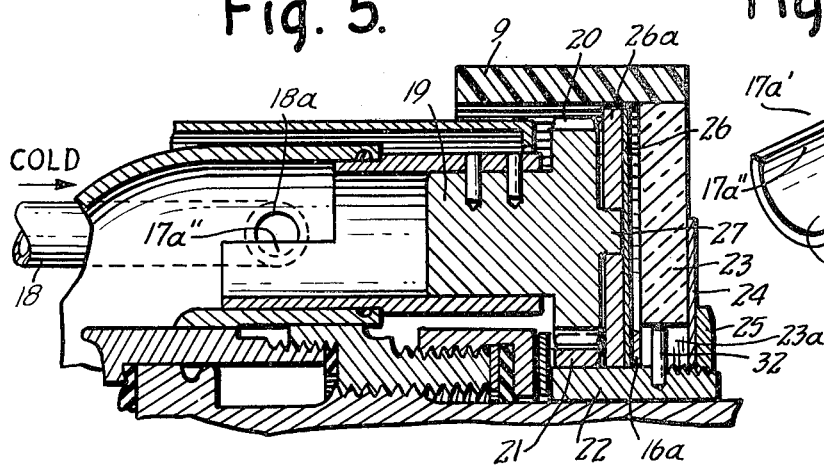
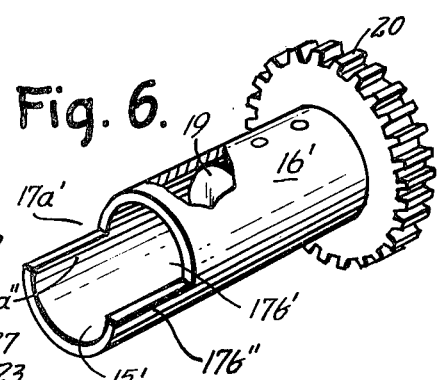

HOT AND COLD WATER RATIO AND VOLUME MANUAL DEVICE

This invention relates to a water temperature manual control and off-on water-flow device.

BACKGROUND OF THE INVENTION

Prior to the present invention, there have existed mixing devices such as thermostatically controlled valves responsive to a manual setting, in which the valves controling respective flows of hot and cold water in the respective hot water inlet conduit and cold water conduit, are typically butter-fly valves as in the U.S. Pat. No. 2,463,640 to Plett, and longitudinally-movable valves spring-biased, and other longitudinally-movable and variable-channeled valve structures as typically illustrated by U.S. Pat. No. 3,661,181, any and all of which fail to provide for subjective accurate estimation and adjustment to a specific temperature, much less acheiving such devoid of loss of volume adjustment during such variation, and devoid of obtaining full pressure throughout. Also, a separate volume control and separate ratio control are not readily obtainable, much less with separate controls being readily and conveniently simultaneously accessible. Thermostatically controlled mechanisms are highly subject to malfunctioning and are of poor durability, and also the cost of production of such mechanisms is normally prohibitive. Also, such prior devices are adaptable and reserved for installation solely in the initial building of a house or laboratory or the like. In addition, however, and more importantly, both improved sealing against unwanted flow through a valve mechanism as well as greater life or durability of the dependable nature thereof are desired for such a regulator device in order that corrosion of water-containing chemicals and/or extended wear over prolonged usage does not substantially alter the degree of precision in fine adjustments or flow from the respective hot and cold water conduits.

SUMMARY OF THE INVENTION

Accordingly, objects of the present invention include the obtaining of a manually adjustable hot-cold water ratio mechanism directly responsive to adjustment, always at full water pressure.

Another object is to obtain greater simplicity of structure and mechanism of a manual mixer of hot and cold water, and thus concurrently lower cost of production, with an associated volume-control lever as a part thereof but separately variable of volume.

Another object is to obtain enhanced durability of such device, and/or to avail presetting to desired warmth or coolness.

Another object is to obtain improved responsiveness to adjustment, together with more accurate control over flow control of each of hot and cold water flows.

Another object is to obtain a unit having a reliable and meaningful manual control and temperature indicator mechanism for concurrent consideration during period of adjustment of desired temperature control of admixed water from hot and cold water flow conduits, adjustable substantially concurrently with but separate from volume control-adjustment.

Another object is to obtain improved mechanical advantage together with precision regulation availability, in the available regulation of flow for joint control of hot and cold water inlets to a common mixing chamber, devoid of change in total volume of flow of adjusted-temperature water.

Other objects, including obviating and/or avoiding the problems of prior devices discussed above, become apparent from the preceding and following disclosure.

Objects of the present invention, one or more thereof, are obtained by the disclosure as set forth by way of general description and example, in the preceding and following disclosure.

Broadly the invention may be described as a chamber-defining structure defining a single chamber therein with at least one outlet and having at least two inlets, one of which is a hot water inlet and one of which is a cold water inlet, and conduits thereof, with a revolvable tubular water-temperature control structure including one valve in association with the hot water conduit and with another separate valve in association with the cold water conduit, both control valves being commonly controlled simultaneously by direct manual to-and-fro revolving of the tubular control structure, devoid of alteration of total volume of flow; in combination, by a shaft extending axially through an annular handle structure such as an annular disk, there is provided connection to a volume-control valve controlling flow volume of hot and/or cold waters already mixed upstream. The leverage, between the annular disk/handle and the ratio control valves, and the flow apertures of those valves, are located and positioned such that regulation to increase flow through one results simultaneously in first fully-opening one valve before thereafter begining to close the other, whereby full water pressure is maintained, while nevertheless providing for varying from all hot to all cold water. The valves of the water-ratio (temperature) control mechanism, utilize preferably face-to-face plates having matchable orifices for flow therein with the flow control being effected by movement of one plate slidably along the face of the other to vary the size of remaining matched orifices, results in an overall improved generic combination of this invention.

In a preferred embodiment of the flush plates, one is convex in the matched face thereof having the orifice therein, while the matched other face is concave and is flushly and sealably seated with the convex face movable slidably within the concave space.

In another preferred embodiment, included between the actuating revolvable annular handle/disk, and each of the hot and cold water valve mechanisms, is a gear mechanism or system including at least two serially-engaging gears providing mechanical advantage to regulation of the movable one of the face-to-face plates for each respective valve mechanism, and concurrently thereby providing for minor movement and thereby precise control in movement of the movable plate and flow-space associated therewith, relative to the stationary plate and orifice thereof, by major manipulation of the annular handle.

THE FIGURES

FIG. 3 illustrates an in-part view of the FIGS. 1 and 2 embodiment in elevation plan, with partial cut-away.

FIG. 4 illustrates in side-rear perspective view, with partial cut-away, the operative elements of the valve and gear mechanism and handle thereof, in exploded view, for the revolving of the valve tubular water-temperature control structure.

FIG. 5 illustrates in side-cross-sectional view comparable to the FIG. 2 view, an alternate embodiment in an in-part view thereof.

FIG. 6 illustrates in side-rear perspective view, the alternate tubular water-temperature control structure of the FIG. 5 embodiment, with partial cut-away for improved illustration.

DETAILED DESCRIPTION OF THE INVENTION

Figure 1:
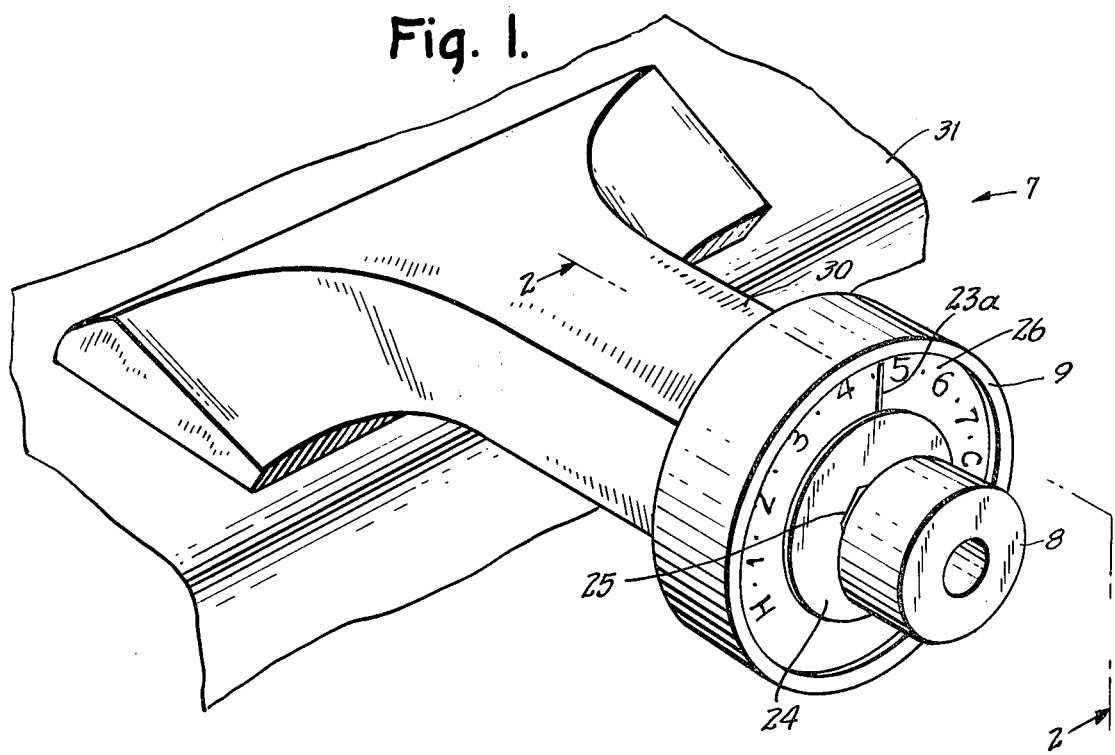
FIG. 1 illustrates in side-front perspective side view, a sink-mounted faucet and control device of the present invention in an in-part view of the mounting sink structure.

For purposes of understanding primary features, it is noted that a common feature throughout all embodiment of this invention, in so far as the respective conduit outlet orifice of each inlet conduit, and the corresponding remaining valve structure thereof is concerned, is that the conduit outlet orifice has flow therethrough subject to being turned off or on, or blocked or unblocked substantially, by virtue of a surface slidable to and fro, respectively, thereover. The plate surface is slidably movable across and over the respective conduit outlet orifice to block flow substantially, and from over the conduit outlet orifice to unblock flow. It should be noted that a perfect seal is not critical nor all-important since the valve mechanism thereof is not a faucet shut-off valve, but is a mechanism merely to apportion the amount of flow through a particular conduit outlet orifice relative to another outlet orifice relative to another conduit outlet orifice, the shut-off valve or mechanism being located serially downstream in the path of flow of the water after proportioned amounts have first been determined and mixed. While some embodiments have a sliding plate portion for each conduit outlet orifice with a through-space hole therein, as an outlet herein referred to as a matching hole, such term is also intended to include the absence of structure at an end of a plate portion in a mechanism where a blocking portion of a plate portion is merely withdrawable of the end or side edge thereof from over the conduit outlet orifice in order to unblock flow from that conduit outlet orifice. As set forth previously, the improved control arises from this common similarity of opening and closing flow from a conduit outlet orifice by the sliding to and fro in surface contact, preferably, the slidable plate with the blocking surface thereof, as compared to the conventional valves such as butterfly valves and plug-type valves which merely move to and fro into and out of an orifice to block or unblock flow therethrough.

Another common feature is that as one valve is subjected to movement of the sliding plate portion such that the conduit outlet orifice thereof becomes eventually opened, simultaneously movement of the sliding plate portion for the other inlet conduit's outlet orifice is moving in a sliding direction that will eventually close that other conduit outlet orifice, while at all times total flow remains unaltered, since volume of flow is separately controlled, but by a lever extending conveniently through the bore-aperture of the annular handle/disk.

It should further be understood, except for differences in mechanism of the lever structure typically as illustrated herein, it is immaterial whether or not the plate portion of the opening and closing valve mechanism of one conduit outlet orifice is or is not a part of a common plate for another plate portion for a corresponding other conduit outlet orifice; accordingly, in some embodiments, both plate portions may be a part of a common plate—as in the illustrated preferred embodiments, while in other embodiments not illustrated the respective plate portions may be parts of separate plates or separate valve structures.

In the embodiments of FIGS. 1-4, and of FIGS. 5-6, they are similar to one-another in the sense of there being a revolvable cylinder, or revolvable part-cylinder, each of which is revolvable around an axis corresponding to a center top-to-bottom axis of a tube or cylinder.

While these variations are important, as noted above there are controlling generic similarities.

A particular preferred feature of all embodiments illustrated, is the feature that for a particular closed conduit outlet orifice, an opening movement of the matched plate portion will eventually result in a totally "unblocked" flow path "before" any at all has taken place or "before" any significant amount of closing (blocking) has taken place, for the corresponding other conduit outlet orifice. By virtue of this feature, where desired, flow from both the hot inlet conduit and the cold inlet conduit may be fully opened concurrently, but more importantly the two valves (hot and cold) will always thereby have at least one conduit outlet orifice substantially totally unblocked (not blocked) for flow therethrough; thereby, full water pressure will always be maintained, which would not be the case if one orifice were partially closed before the other was fully or substantially-fully opened.

It is to be understood that there are many other possible embodiments, variations, and combinations typified by the merely illustrative embodiments of these Figures, and that it is within the scope and spirit of the invention to make such variations and substitution of equivalents, and modifications, as would be apparent to a person of ordinary skill in this art. In like manner, the invention is thus also adapted to "any" fluid, whether gas, liquid, or flowing-solid such as mercury, i.e. not merely directed to embodiments for water.

Figure 2:
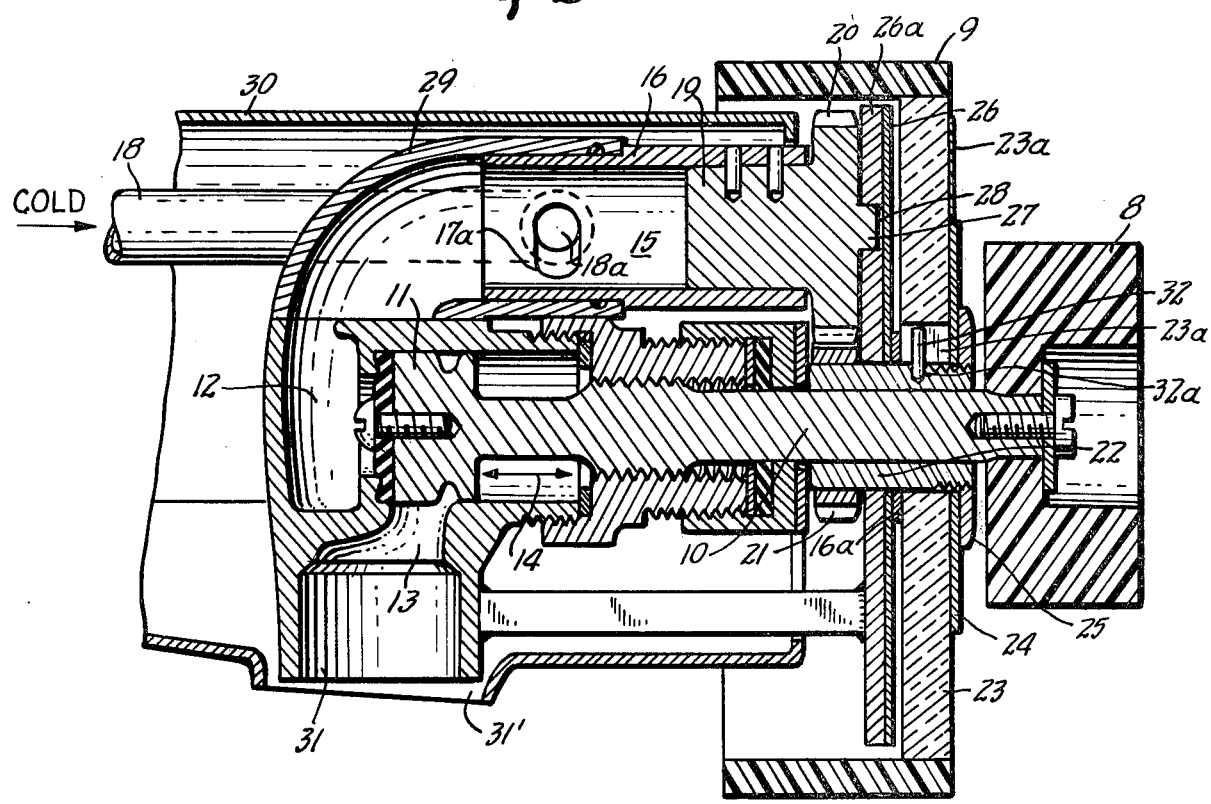
FIG. 2 illustrates an in-part view in side cross-sectional view as taken along line 2—2 of FIG. 1 view.

Accordingly, FIG. 1 illustrates a sink-mounted faucet combination 7 including a faucet housing 30 mounted on a sink base support 31, with closely-associated conveniently located volume control handle 8 and temperature control handle 9, as also seen in FIG. 2 which is taken in cross-section along line 2—2 of FIG. 1.

In FIG. 2 and FIG. 3, various elements are identifiable. The handle 8 is fixedly mounted on the elongated flow control shaft 10 which extends through the annular temperature control handle 9, through the central aperture bore thereof. At a distal end of the shaft 10 is the flow-control axially to-and-fro slidable (insertable) plug structure 11 of conventional type, in the path of flow of water from space 12 to space 13, as water flows from space 15 into space 12, dependant upon movement of the plug structure 11 in to-and-fro directions 14. Upon revolving the temperature control annular handle 9 in clockwise direction, the transparent plastic (or glass) 23 rotates therewith (as a part thereof) and by virtue of pin 32 in annular gear element 22 having pinhole 23a, rotates the gear element 22 and the gear teeth 21 thereof. Gear teeth 21 cause engaging teeth 20 and tubular valve element 16 to rotate in a counter-clockwise direction. Thus, upon turning manually the handle 9 clockwise, the indicator line 23a located on the transparent plastic 23 serves to indicate the relative temperature along scale element 26, moving toward a higher number—toward the cold shown as "C;" accordingly, the fully-aligned "open" state of the matched apertures 17a and 18a remain fully-opened—at thus full water-pressure, while on the opposite side of the element 16 the hot water valve aperture 17b thereof is being moved downwardly out-of alignment to partially and eventually totally block-off flow through the hot water conduit outlet 19a of hot water conduit 19. On the other hand, to turn the handle 9 in a counter-clockwise direction causes the structure defining the inlet 17a to move downwardly to thus block partially or totally the conduit outlet 18a of cold water conduit 18. At all times hot and/or cold water at full pressure flows into the space 15 through outlet conduit ports 18a and/or 19a, as above-described, the apertures 17a and 18a being fixedly positioned by fixed attachment of the conduits 18 and 19 to the stationary structure 29 defining space 12 and the housing for the plug structure 11. The washer 16a facilitates revolving movement of plastic element 23 relative to the stationary scale element 26 which is typically adhered (or otherwise fixedly attached or anchored) to support structure 26a or the like.

The radially-central key(axle) 27 of gear structure of gear teeth 20, is revolvably mounted in the aperture 28 of the support structure 26a, around which key (the longitudinal axis thereof) the tubular element 16 revolves upon movement of the gear teeth 20. The key or pin 32 locks into a slot 23a of the plastic element 23. The annular handle 9 is locked into position by the washer 24 and nut 25 screwed onto the male threads of the forward end of gear element 22. The shaft 10, noted above, extends through the bores of these respective elements, in a non-binding state, not turning-with rotation of these elements. In like manner, the annular elements do not turn-with the to-and-fro clockwise and counter-clockwise revolving of the shaft 10 during the to-turning on or up and off or down of water-flow volume from space 12 into space 13. From space 13, water flows through spout 31, which is aligned within faucet outlet 31'.

These same elements are viewable to a large extent, in the exploded view of FIG. 4.

FIG. 5 and 6 illustrate an alternate embodiment which has substantially identical elements and operates the same, with the exception of the tubular member 16' not having non-essential in-part circumscribing aperture walls, since it is the blocking portions that are important to the invention, for the blocking-off alternately of the apertures 18a and 19a (the same as prior Figures). Accordingly, the structure 19 of gear teeth 20, is the same; the tubular structure 16'—while still shown as tubular in-part, need not necessarily be tubular but merely anchored onto structure 19, except that the blocking wall portion 17a" adjacent free-space 17a', and the blocking wall portion 17b" adjacent free-space 17b', must be curved (angular) in shape to fit and thus block flow from respective conduit outlets 18a and 19a, into flow space 15'.

It is believed, however, that there is advantage to the element 16, as compared to element 16', in that the additional tubular structure of the distal end of the element 16 serves to offer improved support, particularly over an extended period of use and accompanying wear of parts.

Accordingly, variations and modifications within the spirit of the invention as disclosed, are within the protection of this invention, as claimed hereinafter. For example, there may be spacedapart valve components for ratio-control, and for volume control, respectively.

The invention can be also used for showers, sinks, baths—bath tubs, industrial applications, and combinations thereof, and the like.

I claim:

1. A manual water faucet temperature control device consisting essentially of a single-chamber-defining structure substantially forming common first-flow space and valve-seating space and having a first inlet orifice and a second inlet orifice in communication with said first flow space, having an outlet orifice, and having a valve-seating port; a single unitary valve structure sealably seated within said valve-seating port, the single unitary valve structure having a first plate portion sealably seated in justaposition to the first inlet orifice and adapted to move to and from alternate blocking position and non-blocking position relative to said first inlet orifice as the single unitary valve structure is rotated either clockwise or counter-clockwise within said valve-seating port, and said single unitary valve structure further having a second plate portion sealably seated in justaposition to the second inlet orifice and adapted to move to and from alternate blocking position and non-blocking position relative to said second inlet orifice as the single unitary valve structure is rotated either clockwise or counter-clockwise within said valve-seating port, the first plate portion and the second plate portion each being mounted in positions adapted for the first and second plate portions to slide over the respective first and second inlet orifices to and from respective said blocking positions and respective said non-blocking positions and each of the first and second plate portions being of predetermined size dimensions and positioned relative to one-another, adapted such that while one is not blocking the inlet orifice associated therewith the other one thereof may range from substantially complete blocking to substantially complete absence of blocking of the inlet orifice associated therewith, and further adapted such that while the other is not blocking the inlet orifice associated therewith the said one thereof may range from substantially complete blocking to substantially complete absence of blocking of the inlet orifice associated therewith, whereby when a hot water conduit is connected to one and a cold water conduit is connected to the other of the first and second inlet orifices relative proportions of hot and cold water may be varied from full pressure hot-flow to full pressure cold flow into said valve-seating space within the single-chamber-defining structure and out-of the outlet orifice thereof; and lever means for moving the single unitary valve structure in alternate opposite directions within the valve-seating port; said single unitary valve being located within said valve-seating space within the single-chamber-defining structure, said single-chamber-defining structure being substantially cylindrical in shape with the valve-seating port at one end thereof and with the outlet orifice at an opposite end thereof, and having said first and second inlet orifices positioned within cylindrically-shaped walls thereof, and said single unitary valve structure and the first and second plate portions thereof each having a flow-blocking surface convexly shaped and seated within cylindrically-concave walls of the single-chamber-defining structure, said single unitary valve structure being rotatable; and a guage means for providing a visually discernable scale indicative of from time-to-time positioning of the single unitary valve structure, including at least one of a scale and a pointer mounted on said single-chamber-defining structure and said lever means, and a remaining one of the scale and the pointer mounted on a remaining other of said single-chamber-defining structure, with the pointer and scale being in juxtaposition to one-another and indicative of degree to which said first and second inlet orifices respectively are blocked by the single unitary valve structure; said lever means comprising an annular handle; and a volume control means for regulating volume of flow from said said first flow space, the volume control means including a shaft extending and movable axially and sealably through a central opening of said annular handle, and said shaft having a volume-control valve mounted on a distal end thereof, said single-chamber-defining structure forming a common second flow space and volume-control seating space, said volume-control valve being seated sealably within said volume-control seating space positioned to be moved alternately axially in opposite directions to open and close flow and regulate rate of flow through said orifice responsive to movement axially of said shaft in intermittently opposite directions.

* * * * *